July 11, 1950 F. A. RIGBY Re. 23,247

FLAKE ICE MAKING MACHINE

Original Filed Feb. 25, 1946 2 Sheets-Sheet 1

INVENTOR.
FLOYD A. RIGBY
BY
ATTORNEY

July 11, 1950 F. A. RIGBY Re. 23,247
FLAKE ICE MAKING MACHINE
Original Filed Feb. 25, 1946 2 Sheets-Sheet 2
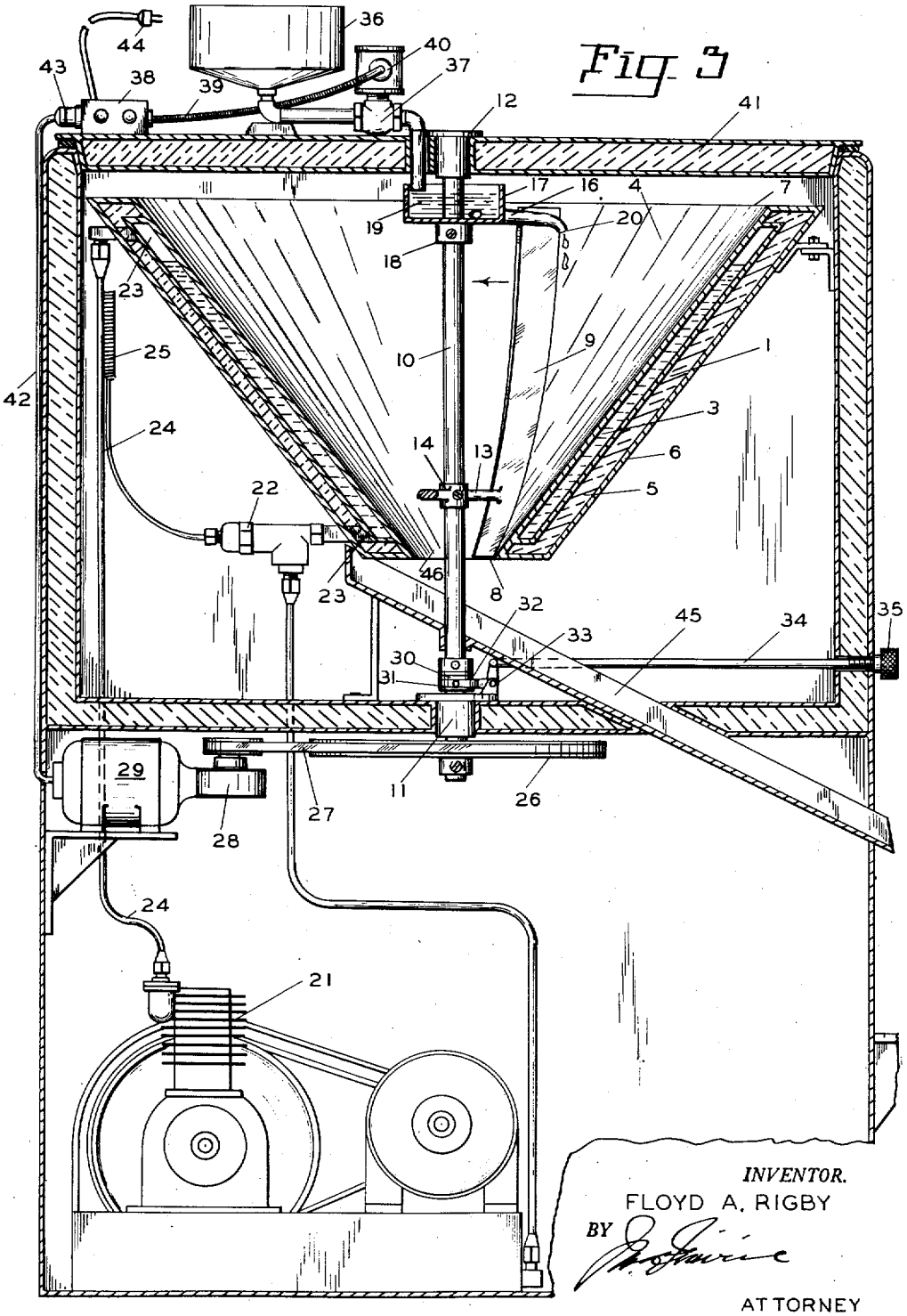
INVENTOR.
FLOYD A. RIGBY
BY
ATTORNEY Reissued July 11, 1950

Re. 23,247

UNITED STATES PATENT OFFICE 23,247

FLAKE ICE MAKING MACHINE

Floyd A. Rigby, Portland, Oreg.

Original No. 2,490,324, dated December 6, 1949, Serial No. 649,971, February 25, 1946. Application for reissue March 16, 1950, Serial No. 150,099

7 Claims. (Cl. 62—107)

Matter enclosed in heavy brackets [ ] appears in the original patent but forms no part of this reissue specification; matter printed in italics indicates the additions made by reissue

This invention relates to machines for making flake ice and can be particularly adapted for counter merchandising.

The primary object of the invention is to freeze a liquid while running over an inclined surface, after which the same is removed from the surface by a scraper and delivered into a delivery chute.

A further object of the invention is to provide a freezing machine that can be adjusted for making flake ice of various thickness or coarseness.

A further object of the invention is to provide means for readily interchanging the supply of liquid to be frozen to any flavor or type of mixture.

And a still further object of the invention is to provide easy access to the freezing chamber for the cleansing of the machine.

These and other incidental objects will be apparent in the drawings, specifications and claims.

Referring to the drawings:

Figure 3 is a side sectional *view* of the assembled machine.

In the drawings:

Figure 2:
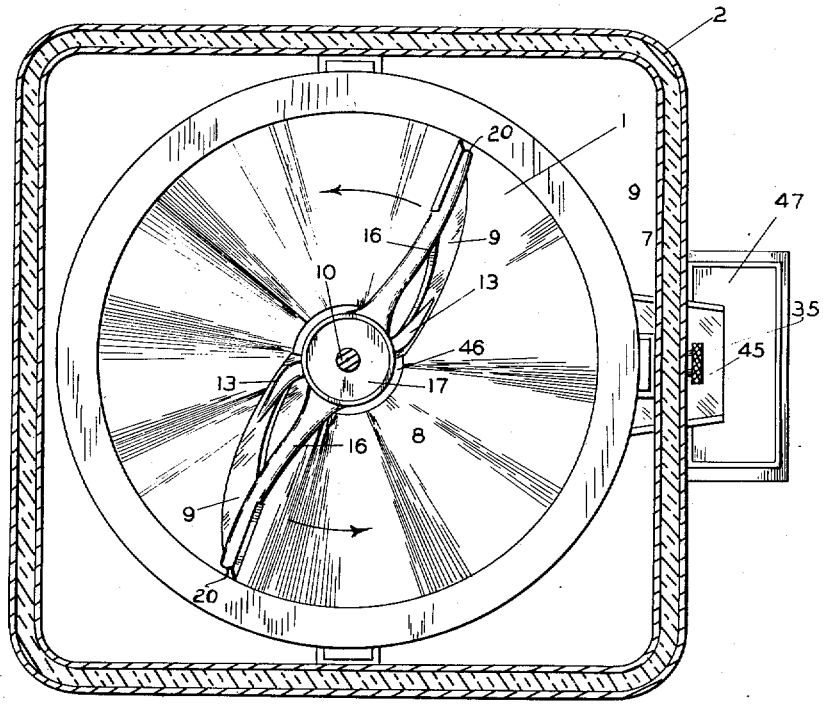
Figure 2 is a plan sectional view, taken on line 2—2 of Figure 3 looking into the freezing chamber.
Figure 1:
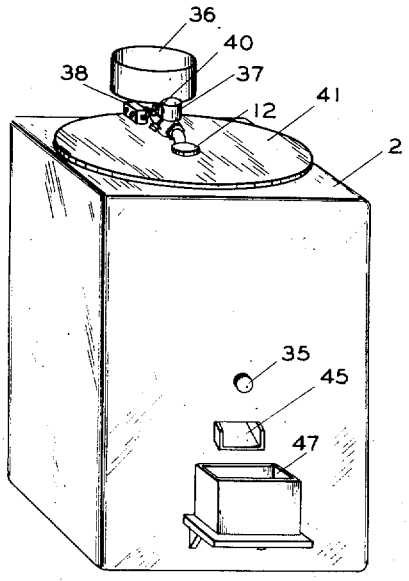
Figure 1 is a perspective front view of a machine for making flake ice.

My new and improved flake ice making machine consists of a cone shaped freezing unit 1 mounted within a cabinet 2. This freezing unit consists of a refrigerant jacket 3 adjacent its inner wall 4. The refrigerant jacket 3 is insulated by suitable insulating material 5, which is encased within the outer wall 6 of the freezing unit. The inner refrigerated wall or surface 4 tapers inwardly from the top edge 7 to the lower or bottom edge 8.

Two or more scrapers 9 contact the surface 4 and rotate in the direction of the arrows. These scrapers or blades are mounted to the perpendicular shaft 10, which is journalled within suitable bearings 11 and 12. The lower ends of the scrapers 9 are secured to the arms 13, which in turn are provided with a hub 14, which is secured to the shaft 10 by any suitable fastening means, as key 15. The upper ends of the scrapers are secured to the arms 16 which form part of the bowl 17 which in turn is part of the hub 18 secured to the shaft 10.

The arms 16 are hollow for communicating with the liquid 19 contained within the bowl 17. This liquid is delivered through the arm 16 to the discharge point 20, which follows the scrapers 9 in their rotation delivering the liquid to be frozen or flaked onto the surface 4, which freezes the liquid as it runs down over the inclined surface being frozen as it travels towards the lower part of the freezing unit. This freezing takes place rapidly, *and* before the next scraper reaches *a given point on the surface 4*, the liquid [the same] will have been flaked or frozen on the surface 4.

The freezing unit[s] is supplied by refrigerant from a compressor unit 21 through the expansion valve 22 into the lower part of the refrigerant jacket 3. The refrigerant is returned to the refrigerating machine from the point 23 by way of tubing 24. The usual automatic control unit 25 is supplied for controlling the expansion valve 22. The scraper blades 9 are rotated by the vertical shaft 10, which in turn is driven by the pulley 26, belt 27, speed reducer 28 and the motor 29.

A vertical thrust bearing 30 is provided for supporting the weight of the shaft 10 and the scrapers 9. This thrust bearing can be raised and lowered by a yoke 31 and bell crank 32, which is pivotally mounted at 33 to the bearing 11. The bell crank is operated through the rod 34 and the adjusting knob 35; the object of this adjustment is to govern the pressure of the blades 9 against the surface 4. This adjustment is quite important to smooth operation of the machine and can be made easily by the operator of the same.

The liquid to be frozen is contained within a container 36 and an automatic magnetic valve 37 admits the liquid into the bowl 17 when the control switch 38 is operated for starting and operating the motor 29. The switch 38 includes two buttons, the depression of one of which causes the closing of the circuit while the depression of the other opens the circuit. In other words, unless the scrapers 9 are revolving, no liquid can enter the freezing unit until the motor 29 is brought into operation revolving the rotors.

The electric wire 39 plugs into the valve unit at 40 and can be readily removed. The liquid container 36, including the valve, can be removed from the machine whenever desired, the valve assembly can be removed from the container 36 and placed on another container having either the same liquid or a different type of liquid to be frozen or flaked. I do not wish to be limited to a unit of this kind as the liquid could be piped directly into the machine by ordinary piping, which would also be controlled by a valve hooked up in synchronism with the motor 29.

In order to cleanse the machine, an insulated top 41 is provided. The wiring 42 leading to the motor can be unplugged at 43 so that the top and switch mechanism can be removed from the machine.

I will now describe the operation of the machine in the freezing or flaking of ice. The container 36 is placed on the machine, together with the valve 37 and the connections 40 made. When the switch 38 is closed, the motor 29 will receive electric energy from the source of supply 44, magnetic valve 37 will also be operated admitting liquid from the container 36 into the bowl 17 and the liquid will be discharged through the arms 16 and the outlets 20 over the inclined freezing surface 4. The blades 9 will be revolved by the operating of the motor 29 and the freezing and scraping operation will continue, the scrapers 9 scraping the frozen material from the surface 4 delivering it into the chute 45 from the discharge point 46 and delivering the same by way of the chute 45 into the container 47.

One of the outstanding features of my invention is that due to the sloping or inclining of the freezing surface, the liquid has a chance to be completely frosted before it reaches the discharge point of the refrigerating unit. If this surface were not sloping, there would always be an overflow of liquid through the discharge that would be mixed with the finished product and would have to be drained off in some manner; therefore by using an inclined freezing surface, I eliminate this difficulty.

I do not wish to be limited to the exact mechanical structure shown, as other mechanical equivalents may be substituted still coming within the scope of my claims.

What I claim as new is:

1. A flake ice making machine, including a container, a downwardly convergent refrigerating element mounted in the container and presenting a relatively smooth surface, means for delivering refrigerant to such refrigerating element, means adjustable axially of the refrigerating element for delivering the fluid to be frozen to the smooth inner surface of the refrigerating element, and scrapers connected to fluid delivering means and driven in contact with said smooth surface to scrape the frozen layer therefrom.

2. A construction as defined in claim 1, wherein the lower end of the refrigerating element is open for the discharge of the scraped frozen material, and wherein a chute is arranged below and having an area commensurate with that of the opening to receive such scraped material and deliver it beyond the container.

3. A construction as defined in claim 1, wherein the material to be frozen is delivered to the surface of the refrigerating element from a tank to a receptacle within the container, and delivery piping for the material from the receptacle to the inner surface of the refrigerating element, the scrapers being supported by the piping.

4. A construction as defined in claim 1, wherein the first means are provided for delivering a refrigerant to the lower end and outer surface of the refrigerating element and wherein further means are provided for extracting or removing the refrigerant from the upper and outer end of the refrigerating element.

5. A construction as defined in claim 1, wherein the means for delivering the fluid to be frozen to the refrigerating element, includes a tank having pipe connection with the interior of the container, with such pipe connection and tank freely removable from the container to provide for substitution of tanks of other material.

6. A construction as defined in claim 1, wherein the means for delivering the fluid to be frozen to the refrigerating element, includes a tank having pipe connection with the interior of the container, with such pipe connection and tank freely removable from the container to provide for substitution of tanks of other material, and wherein the pipe is provided with a magnetic valve for controlling the flow, and means for operating the valve.

7. A flake ice making machine, including a container, an inverted conical refrigerating element supported in the container, means for delivering the refrigerant to the outer surface of the refrigerating element, means for delivering the fluid to be frozen onto the [outer] *inner* surface of the refrigerating element, means for scraping the frozen material from the inner surface of the refrigerating element and manually operable means for adjusting the position of the scraping means to vary its scraping contact.

FLOYD A. RIGBY.

REFERENCES CITED

The following references are of record in the file of this patent:

UNITED STATES PATENTS

| Number | Name | Date |
|---|---|---|
| 2,064,597 | Engelmann | Dec. 15, 1936 |
| 2,080,639 | Taylor | May 18, 1937 |
| 2,228,998 | Birdseye | Jan. 14, 1941 |
| 2,282,862 | Genova | May 12, 1942 |
| 2,415,585 | Genova | Feb. 11, 1947 |

FOREIGN PATENTS

| Number | Country | Date |
|---|---|---|
| 591,123 | Germany | Jan. 17, 1934 |